Sept. 15, 1964  C. P. CLARK ETAL  3,148,888
CASTING COMPOSITIONS AND PRODUCTS THEREOF
Filed Oct. 15, 1962

INVENTOR.
Charles P. Clark
BY Philip L. Gordon

William M. Anderson
ATTORNEY

United States Patent Office 3,148,888
Patented Sept. 15, 1964

3,148,888
CASTING COMPOSITIONS AND PRODUCTS
THEREOF
Charles P. Clark, Cambridge, and Philip L. Gordon, Lexington, Mass., assignors to The General Latex and Chemical Corporation, Cambridge, Mass., a corporation of Massachusetts
Filed Oct. 15, 1962, Ser. No. 230,608
10 Claims. (Cl. 277—237)

The present invention is concerned with polyurethane foam casting compositions and more particularly with polyurethane compositions which are especially useful for casting annular sealing rings on sewer pipes and the like.

Conventional sewer pipes generally consist of a cylindrical conduit having at one end a spigot and at the other end a bell socket adapted to receive a spigot. In the production of such sewer pipes, and especially those made from ceramic materials, the dimensions of the spigot and bell sections are not always uniform. It has become the custom to subsequently cast complementary annular sealing rings, of close tolerance, on the spigot and bell sections for use in joining the pipes. The annular sealing rings may comprise the sole means of joining the pipes or they may be used in combination with other means such, for example, as rubber O-gaskets. Various molds and methods have been proposed for casting the annular sealing rings on the pipes. As examples of such molds and processes, mention may be made of those disclosed in U.S. 2,284,741, U.S. 2,401,554 and U.S. 2,986,411.

Usually, the materials from which the annular sealing rings are formed, must be root and leak proof, have good weathering characteristics and be able to withstand the pressures encountered on burial. Further, the materials must exhibit good adhesion to pipes and be resistant to bacteria, water, acids, alkali, sewage, etc. Still further, they must be relatively inexpensive and capable of being easily and economically cast. Although, various materials which provide a reasonably tight seal and which exhibit some of the desired properties have been proposed, the need still exists to provide casting compositions which will fulfill all of these requirements. Some materials previously proposed are readily cast but have poor compressive strengths or poor weatherability. Others have good physical properties but require long casting times or high temperature cures. The present invention is concerned with providing novel polyurethane foam casting compositions which are especially useful for forming annular sealing rings on sewer pipes, etc.

One object of the present invention is to provide novel polyurethane foam compositions which have extended "cream" or "lag" times during which they may be poured and distributed evenly throughout the narrow voids of a mold but which will cure rapidly, once foaming is initiated, without additional heating, so that they may be demolded in periods such, for example as 15 to 30 minutes.

Another object of the present invention is to provide novel polyurethane foam casting compositions, having the curing characteristics set forth above, which when cured, provide a foamed plastic structure possessing physical properties which are especially suitable for joint sealing rings on sewer pipes and the like.

Other objects of the invention will in part be obvious and will in part appear hereinafter.

The invention accordingly comprises the product possessing the features, properties and the relation of components and the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 1:
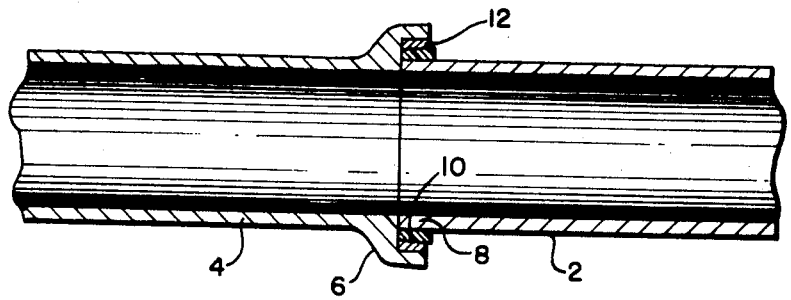
FIGURE 1 is a sectional view showing two sewer pipes joined by annular rings formed from the polyurethanes of this invention.

Generally the formation of foamed polyurethane plastics comprises a polyaddition reaction between a polyol and a polyisocyanate in the presence of a suitable foaming agent such as water. Usually such processes are somewhat complex and involve a series of competing physical and chemical reactions. In the past, polyurethane foam compositions, having extended cream times could be compounded with little difficulty. Usually, however, such extended cream times were gained at the expense of slow cure times. Conversely, polyurethanes having rapid cure times could also be readily compounded, however, they were accompanied by a substantial shortening of the cream times. The polyurethane compositions of the present invention provide a unique delayed action that allows relatively long cream times but rapid cures once foaming is initiated.

In the compositions of the present invention, the unique cures are achieved by employing an activator system comprising the combination of an alkaline catalyst and an iron catalyst selected from the group consisting of ferrous acetyl acetonate and ferric acetyl acetonate. Preferably the alkaline catalyst is an amine and more preferably is a tertiary amine. As examples of useful alkaline catalysts mention may be made of sodium methoxide, sodium pentachlorophenate, dimethyl ethanolamine, diethyl ethanolamine, pyridine, dialkylanilines such as N,N-diethylaniline, N-methyl morpholine, triethylamine, N,N-diethylcyclohexylamine, triethylene diamine, N,N,N',N'-tetramethyl-1, 3-butanediamine and tetramethylguanidine. Especially useful cream times were achieved by using ferric acetyl acetonate as the iron catalyst and a tertiary amine and more particularly trialkylamines and hydroxyalkylamines such as dimethyl ethanolamine as the alkaline catalyst.

Generally the activator systems of the present invention may be used in the various processes employed for producing foamed polyurethanes e.g., one-shot methods, two-shot methods, etc. Especially useful results have been obtained when the activator system was used in a two-shot method in which one phase comprises a prepolymer of the polyol with an excess of polyisocyanate.

The amount of iron catalyst and alkaline catalyst employed in the reaction compositions may usually be varied over some range. Preferably between about 0.20 to 0.80 millimoles of the iron catalyst and between about 1.2 to 4.8 millimoles of the alkaline catalyst are used per mole of reactable isocyanato (or isocyanate) groups present. In particularly preferred embodiments between about 0.40 to 0.70 millimoles of the iron catalyst and 2.4 to 4.0 millimoles of the alkaline catalyst are used per mole of isocyanate groups. Especially good results have been obtained using about 0.60 millimoles of the iron catalyst and 3.2 millimoles of the alkaline catalyst.

Polyols and polyisocyanate for use in the polyaddition reaction of this invention may be selected from the various materials of this nature available. As examples of the former materials mention may be made of ethylene glycol, 1,4-butylene glycol, propylene glycol, castor oil, 2,2-bis-(4-hydroxyphenyl)-propane (bis-phenol-A), glycerin, 1,2,6-hexanetriol, pentaerythritol, polyesters having reactable hydroxyl groups, polyethers having reactable hydroxy groups, e.g., polyalkylene glycols, etc. As examples of the latter materials mention may be made of ethylene diisocyanate, ethylidene diisocyanate propylene, 2-diisocyanate, butylene-1, 3-diisocyanate, hexylene-1, 6-diisocyanate, cyclohexylene-1, 2-diisocyanate, m-phenylene diisocyanate, 2,4-toluylene diisocyanate, 2,6-toluylene diisocyanate, 3,3'-dimethyl-4,4'-biphenylene diisocyanate, 3,3' - dimethoxy - 4,4' - biphenylene diisocyanate, 3,3'-diphenyl-4,4'-biphenylene diisocyanate, 4,4'-biphenylene diisocyanate, 3,3'-dichloro-4,4'-biphenylene diisocyanate, 1, 5-naphthalene diisocyanate, triphenylmethane triisocyanate, and PAPI (Trademark of Carwin Co., North Haven, Connecticut) for a polymethylene-polyphenyl isocyanate having a molecular weight between about 380 to 400. Particularly useful results have been obtained with the diisocyanate and especially arylene diisocyanates such as toluene diisocyanates e.g., TDI 80/20 (an 80/20 mixture of the 2,4- and 2,6-toluene diisocyanate isomers).

Generally the ratio of the hydroxyl groups to the isocyanato (isocyanate) groups may be varied over a considerable range, e.g., about 0.5 to 1.5 reactable isocyanato groups for each reactable hydroxyl group. In preferred embodiments between about 0.9 to 1.2 reactable isocyanato groups are present for each hydroxyl group and in especially preferred embodiments about 1.0 to 1.05 isocyanato groups are used per hydroxyl group.

As set forth above the activator systems disclosed herein have been found particularly useful in the compositions of this invention for casting annular sealing rings on sewer pipes, etc. Polyols for use in such compositions may be selected from the various polyhydric materials available such for example as those set forth above. Generally at least a portion and usually a major portion (based on equivalents) of the polyhydric materials will be selected from rigid foam forming polyols which hereinafter will be referred to as "rigid foam polyols." Especially useful results have been obtained using rigid foam polyols which are at least trifunctional and which have a hydroxyl number of at least about 250, more particularly 250 to about 1846 and especially 250 to 700.

A preferred class of rigid foam forming polyols for use in the compositions and sealing rings of this invention are the polyethers formed by reacting alkylene oxides comprising 2 to 4 carbon atoms with polyhydric alcohols comprising, for example 3 to 8 reactable hydroxyl groups. As examples of polyhydric alcohols useful in preparing the polyethers, mention may be made of glycerine, 1,2,6-hexane-triol, pentaerythritol, pentoses, sorbitol, glucose, sucrose, fructose, etc. Usually the ratio of alkylene oxide to polyhydric alcohol may be varied over a considerable range. Especially good results have been obtained from polyethers in this class having hydroxyl numbers in the 250 to 700 range set forth above. When water resistance is desirable, such as in the sealing rings of the present invention, it is preferable to use, at least in part, (e.g., at least 20% by weight) the 3 and 4 carbon atom alkylene oxides, e.g., propylene oxide and butylene oxide in forming the polyethers. As examples of useful polyethers, mention may be made of Atlas G–2410 (Trade Name of Atlas Chemical Industries Inc., Wilmington, Delaware, for a propoxylated sorbitol having a hydroxyl number of about 490), Voranol RS 530 (Trade Name of Dow Chemical Co., Midland, Michigan, for a propoxylated sucrose having a hydroxyl number of about 530) and PEP–450 (Trade Name of Wyandotte Chemical Corp., Wyandotte, Michigan, for a propoxylated pentaerythritol having a hydroxyl number of 550).

In the preferred casting compositions of the present invention, the rigid foam polyols are used in combination with flexible foam forming polyols to add improved impact resistance to the sealing rings, etc. Hereinafter said flexible foam forming polyols will be referred to as "flexible foam polyols." Generally such flexible foam polyols will be selected from diols and high molecular weight triols, e.g., having molecular weights between about 675 to 5000. Usually the molecular weight of the diols may be selected over a wide range, e.g., about 62 to 2000. Especially useful results have been obtained using diols selected from the group consisting of the alkylene glycols and polyoxyalkylene glycols. As examples of such materials, mention may be made of ethylene glycol; propylene glycol; butylene glycol-1,3; 2-methyl pentanediol-2,4; 2-ethylhexanediol-1,3; hexamethylene glycol; decamethylene glycol; diethylene glycol; triethylene glycol; tetra-ethylene glycol, polyethylene glycols having molecular weights of about 200, 400 and 600; dipropylene glycol, tripropylene glycol and polypropylene glycols having molecular weights of about 400, 425, 750, 1200 and 2000, etc.

Generally in the preferred compositions of this invention the ratio of rigid foam polyols to flexible foam polyols employed may be varied over a broad range depending upon factors such, for example, as the impact and compressive strengths desired, the functionally and hydroxyl numbers of the rigid foam polyols, etc. Usually, in the compositions of this invention and especially in the compositions intended for use in sealing rings, the employment of about 0.1 to 0.8 equivalents of the flexible foam polyol to about 1 equivalent of the rigid foam polyol will provide foams having good impact resistance and high compressive strengths. It should be understood that generally the higher ratios of the flexible foam polyols will be especially useful with the higher functional rigid foam polyols, e.g., an octafunctional compound having a hydroxyl number between about 250 to 700 and that the lower ratios will be more suitable with the lower functional materials, e.g., a tetrafunctional polyol having a hydroxyl number between about 250 to 700.

The foaming agents for use in the compositions of this invention may be selected from the various materials of this nature available e.g., water, acetic acid, fluorohydrocarbons, etc. The preferred foaming agent is water. As will be understood, the amount used will vary depending on the density desired. Generally, foams which have good compressive strengths and which are suitable for uses such as the sealing rings of this invention may be obtained by using about 0.50 to about 2.8 gms. of water per mole of reactable isocyanato groups ($N=C=O$) present. Foams, which were especially useful in the sealing rings of this invention, were prepared by using between about 1.4 to 2.0 gms. of water per mole of isocyanato groups and more particularly about 1.7 gms. of water per mole of isocyanato groups. Such amounts provide foams which are economically attractive in that they are relatively light, e.g., about 10 pounds per cubic foot and yet possess the physical properties, which are desired in the sealing rings.

The compositions of the present invention may be cast by mixing the various components and adding them to a suitable mold. When desired other reagents such for example as surface-active agents, pigments, fillers, stabilizers, etc., may be employed. In a preferred embodiment a prepolymer of the polyisocyanate and a portion of the polyols is first formed and then mixed with the rest of the components i.e., the foaming agent, the activator system, the residue of the polyols, etc. Generally, when employing a prepolymer, the foaming agent, iron catalyst, alkaline catalyst, polyols etc., are used in ranges such as set forth above and are based on the reactable isocyanato groups present in the prepolymer. Prepolymers comprising about 15 to 40% by weight of reactable isocyanato groups and more particularly about 30% have been found particularly convenient to handle. In casting the compositions of this invention and especially in casting those comprising the prepolymer, the mold is preferably slightly preheated to, for example, about 120 to 140° F. but no additional heating is required to bring about the cures in the times set forth.

Figure 2:
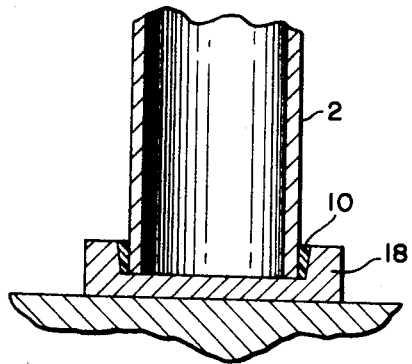
FIG. 2 is a sectional view of a spigot end of a sewer pipe in association with a mold for forming a sealing ring on said spigot.
Figure 3:
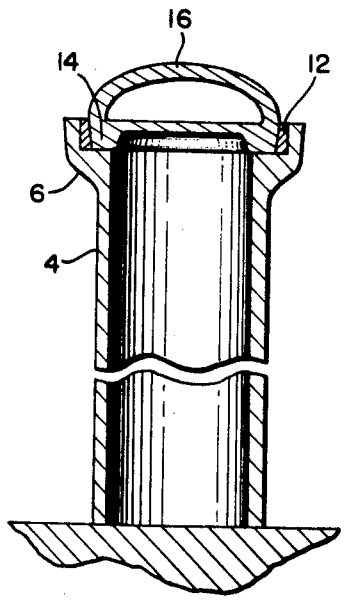
FIG. 3 is a sectional view of a bell socket of a sewer pipe in association with a mold for forming an annular ring in said bell.

Referring now to FIGS. 1, 2, and 3, the sealing rings on the sewer pipes of this invention may be cast in simple molds such, for example, as those shown in FIGS. 2 and 3. FIG. 2 illustrates a mold 18 for casting a sealing ring 10 on the spigot end 8 of a first sewer pipe 2 and FIG. 3 illustrates a mold 14, having a handle 16, for casting a sealing ring 12 on the bell end 8 of a second sewer pipe 4. FIG. 1 illustrates the first 2 and second 4 sewer pipes joined by means of the resulting sealing rings 10 and 12.

The following nonlimiting example illustrates the preparation of a prepolymer for use in the compositions of this invention:

*Example 1*

21.5 parts of a propoxylated sorbitol (a condensation product of sorbitol with propylene oxide) having a hydroxyl number of about 490, was added, with stirring, to 78.5 parts of toluene diisocyanate 80/20. During the addition, cooling was applied, when necessary, to keep the temperature below 160° F. The reaction was continued at 160° F. for about 1 hour. The resulting prepolymer had a viscosity of about 3000 centipoises and contained about 30% by weight of reactable isocyanato groups (—N=C=O).

The following nonlimiting examples illustrate casting compositions within the scope of the present invention:

*Example 2*

100 parts of the prepolymer of Example 1 was blended with a second component comprising the following parts by weight:

| | |
|---|---|
| Polypropylene glycol (molecular weight about 425) | 34.2 |
| Propoxylated pentaerythritol (hydroxyl number about 550) | 51.3 |
| Ferric acetyl acetonate | 0.10 |
| Dimethyl ethanolamine | 0.20 |
| A silicone emulsifier | 1.50 |
| Water | .45 |

The resulting composition had a cream time of at least 1 minute and cured to a hard-skinned rigid foam structure, in less than 30 minutes.

*Example 3*

100 parts of the prepolymer of Example 1 was added to a second component comprising the following parts by weight:

| | |
|---|---|
| Polypropylene glycol (molecular weight about 425) | 32.1 |
| Propoxylated pentaerythritol (hydroxyl number 550) | 48.2 |
| Ferric acetyl acetonate | 0.10 |
| Dimethylethanol amine | 0.20 |
| A silicone emulsifier | 1.50 |
| Water | 0.82 |

The resulting composition had a cream time of at least 1 minute and cured to a hard-skinned, rigid foam structure, in less than 30 minutes.

*Example 4*

100 parts of the prepolymer prepared in Example 1 was added to a second component comprising the following parts by weight:

| | |
|---|---|
| Polypropylene glycol (molecular weight about 425) | 62.5 |
| Propoxylated sucrose (hydroxyl number 530) | 33.7 |
| Ferric acetyl acetonate | 0.10 |
| Dimethyl ethanolamine | 0.20 |
| A silicone emulsifier | 0.50 |
| Water | 0.90 |

The resulting composition had a cream time of at least 1 minute and cured to hard-skinned rigid foam in less than 30 minutes.

*Example 5*

100 parts of the prepolymer as prepared in Example 1 was added to a second component comprising the following parts by weight:

| | |
|---|---|
| Polypropylene glycol (molecular weight about 425) | 59.3 |
| Propoxylated sucrose (hydroxyl number 530) | 31.9 |
| Ferric acetyl acetonate | 0.15 |
| Dimethyl ethanolamine | 0.20 |
| A silicone emulsifier | 1.50 |
| Water | 1.20 |

The resulting composition had a cream time of about 60 to 75 seconds and cured to a hard-skinned, rigid foam in about 15 to 20 minutes.

When flexural strength tests were performed on 10"x2"x⅜" strips of a foam such as produced above and compared with a similar foam made without the diol, it was found that the foams containing the diol could be deflected about twice the distance as the other and required about the same breaking strength.

Tests were run to determine the resistance of the foams of this invention to solutions which they may encounter when used as sealing rings. Generally the tests were conducted by soaking two-inch squares of the material in the solutions for 30 days, drying them for a week and measuring the changes in tensile strengths and volumes. The following illustrates the results obtained with some of the solutions employed:

| Solution | Tensile Strength (p.s.i.) | Percent Change in Tensile Strength | Percent Volume Change |
|---|---|---|---|
| Control | 195 | 0 | 0 |
| 5% aqueous soap | 225 | +15 | <+3 |
| 10% calcium chloride | 219 | +12 | <+3 |
| Gasoline | 212 | +9 | <+3 |
| 5% acetic acid | 210 | +8 | <+3 |
| 25% sulfuric acid | 207 | +6 | <+3 |
| 5% aqueous detergent | 203 | +4 | <+3 |
| 5% nitric acid | 199 | +2 | <+3 |
| Mineral oil | 197 | +1 | <+3 |
| 10% sodium chloride | 195 | 0 | <+3 |
| 5% hydrochloric acid | 190 | −3 | <+3 |
| Xylene | 177 | −9 | <+3 |
| 5% sodium hydroxide | 155 | −21 | <+3 |

When the above compositions were cast in molds such as shown in FIGS. 2 and 3, the resulting rings were strongly adhered to the pipes. Unlike some materials heretofore suggested, the rings retained this strong adhesion even after prolonged outdoor exposure. Further, the rings had higher compressive strengths than some other materials heretofore used so that they would not tend to leak after extended burial periods. Still further, they had good impact, tensile, and sheer-loading strengths as well as good resistance to water, acids, alkali, bacteria, sewage, etc. The fact that rings could be (1) cured without requiring heating, (2) be demolded in short periods of time and (3) had relatively low densities, also made them economically attractive.

Although the sealing rings of this invention were illustrated by those produced in the molds shown in FIGS. 2 and 3, it should be understood that the polyurethane compositions disclosed herein may be used to cast other types of sealing rings such as those previously proposed, e.g., threaded rings, rings requiring a gasket, etc.

Since certain changes may be made in the above product and process without departing from the scope of the invention herein involved, it is intended that all matter contained in the above description or shown in the accompanying drawing shall be interpreted as illustrative and not in a limiting sense.

What is claimed is:

1. A pipe having a bell and spigot end, said bell end and said spigot end having complementary polyurethane rigid foam sealing rings, said rigid foam being formed from a composition comprising a polyether polyol and an organc polyisocyanate, said polyether polyol being at least trifunctional and having a hydroxy number of at least 250 and being formed by condensing a polyol having 3 to 8 hydroxyl groups with an alkylene oxide having 2 to 4 carbon atoms.

2. A pipe as defined in claim 1 wherein said polyether polyol has a hydroxyl number between about 250 and 1846.

3. A pipe as defined in claim 2 wherein said polyether polyol has a hydroxyl number about 250 and 700.

4. A pipe as defined in claim 1 wherein at least 20%, by weight, of the alkylene oxide used to form said polyether polyol comprises 3 to 4 carbon atoms.

5. A pipe as defined in claim 1 wherein said composition also comprises a second polyol selected from the group consisting of diols and triols, said triols having molecular weights between about 675 to 5000.

6. A pipe as defined in claim 1 wherein said composition comprises as a catalyst the combination of a tertiary amine and an iron catalyst, said iron catalyst being selected from the group consisting of ferric acetyl acetonate and ferrous acetyl acetonate.

7. A pipe having a bell and spigot end, said bell end and said spigot end having complementary polyurethane rigid foam sealing rings, said rigid foam being formed from a composition comprising a polyether polyol and an organic polyisocyanate, said polyether polyol being at least trifunctional and having a hydroxyl number between about 250 and 700 and being formed by condensing a polyol having 3 to 8 hydroxyl groups with an alkylene oxide having 2 to 4 carbon atoms.

8. A pipe as defined in claim 7 wherein at least 20%, by weight, of the alkylene oxide used to form said polyether polyol comprises 3 to 4 carbon atoms.

9. A pipe as defined in claim 7 wherein said composition also comprises a second polyol selected from the group consisting of diols and triols, said triols having molecular weights between about 675 to 5000.

10. A pipe as defined in claim 7 wherein said composition comprises as a catalyst the combination of a tertiary amine and an iron catalyst, said iron catalyst being selected from the group consistign of ferric acetyl acetonate and ferrous acetyl acetonate.

References Cited in the file of this patent
UNITED STATES PATENTS

| | | |
|---|---|---|
| 2,770,476 | Cleverly | Nov. 13, 1956 |
| 2,984,679 | Ehrlich et al. | May 16, 1961 |
| 3,021,307 | Csendes | Feb. 13, 1962 |
| 3,036,022 | Stewart | May 22, 1962 |

FOREIGN PATENTS

| | | |
|---|---|---|
| 769,681 | Great Britain | Mar. 13, 1957 |